United States Patent
Wang et al.

(10) Patent No.: US 12,109,533 B2
(45) Date of Patent: Oct. 8, 2024

(54) UREA TANK FOR SCR AFTERTREATMENT SYSTEM, AND TANK COVER THEREOF

(71) Applicants: WEICHAI POWER CO., LTD., Shandong (CN); WEICHAI POWER EMISSION SOLUTIONS TECHNOLOGY CO., LTD., Shandong (CN)

(72) Inventors: Rui Wang, Weifang (CN); Jia Yu, Weifang (CN)

(73) Assignees: WEICHAI POWER CO., LTD., Weifang (CN); WEICHAI POWER EMISSION SOLUTIONS TECHNOLOGY CO., LTD., Weifang (CN)

( * ) Notice: Subject to any disclaimer, the term of this patent is extended or adjusted under 35 U.S.C. 154(b) by 751 days.

(21) Appl. No.: 17/278,623

(22) PCT Filed: Sep. 29, 2018

(86) PCT No.: PCT/CN2018/108515
§ 371 (c)(1),
(2) Date: Mar. 22, 2021

(87) PCT Pub. No.: WO2020/062118
PCT Pub. Date: Apr. 2, 2020

(65) Prior Publication Data
US 2022/0040638 A1 Feb. 10, 2022

(51) Int. Cl.
*B65D 25/02* (2006.01)
*B01D 53/94* (2006.01)
(Continued)

(52) U.S. Cl.
CPC ..... *B01D 53/9431* (2013.01); *B01D 53/9418* (2013.01); *B60K 15/03* (2013.01);
(Continued)

(58) Field of Classification Search
CPC ........... B01D 53/9431; B01D 53/9418; B60K 15/03; B60K 15/04; F01N 3/2066; F01N 2610/1406; F01N 2610/1466
(Continued)

(56) References Cited

U.S. PATENT DOCUMENTS 8,857,648 B2   10/2014   Langemann
9,255,512 B2    2/2016   Huang et al.
(Continued)

FOREIGN PATENT DOCUMENTS

CN   201896653 U    7/2011
CN   203499776   *  3/2014  .............. F01N 11/00
(Continued)

OTHER PUBLICATIONS

PCT International Search Report and Written Opinion, PCT/CN2018/108515, Jan. 23, 2019, 11 pgs.
(Continued)

*Primary Examiner* — Elizabeth J Volz
(74) *Attorney, Agent, or Firm* — Kilpatrick Townsend & Stockton LLP

(57) ABSTRACT

A tank cover of a urea tank for an SCR aftertreatment system is provided with an air hole, a gas inlet hole, a gas discharge hole, a first constant pressure check valve and a second constant pressure check valve. The tank cover is mounted at a liquid injection port of a tank body of the urea tank. The air hole is provided in a portion of the tank cover corresponding to the liquid injection port. The gas inlet hole and the gas discharge hole are provided in the portion of the tank cover corresponding to the liquid injection port. An inlet of the first constant pressure check valve is butted with the air outlet hole. An inlet of the second constant pressure check valve is butted with the air inlet hole.

10 Claims, 4 Drawing Sheets

(51) Int. Cl.
*B60K 15/03* (2006.01)
*B60K 15/04* (2006.01)
*F01N 3/20* (2006.01)

(52) U.S. Cl.
CPC ............ *B60K 15/04* (2013.01); *F01N 3/2066* (2013.01); *F01N 2610/1406* (2013.01); *F01N 2610/1466* (2013.01)

(58) Field of Classification Search
USPC ......... 220/562, 202, 203.01, 203.02, 203.24, 220/203.27, 203.29
See application file for complete search history.

(56) References Cited

U.S. PATENT DOCUMENTS

| | | | |
|---|---|---|---|
| 9,422,850 | B2 | 8/2016 | Cummins et al. |
| 9,739,189 | B2 | 8/2017 | Haesemann |
| 9,938,875 | B2 | 4/2018 | Cummins et al. |
| 10,036,295 | B2 * | 7/2018 | Tsuchiya .................. F01N 9/00 |
| 10,087,804 | B2 | 10/2018 | Muntean et al. |
| 10,654,356 | B2 | 5/2020 | Behnamrad et al. |
| 2012/0248114 | A1 | 10/2012 | Langemann |
| 2015/0027553 | A1 | 1/2015 | Cummins et al. |
| 2015/0027556 | A1 | 1/2015 | Huang et al. |
| 2015/0030466 | A1 | 1/2015 | Muntean et al. |
| 2015/0377105 | A1 | 12/2015 | Haesemann |
| 2016/0326929 | A1 | 11/2016 | Cummins et al. |
| 2018/0111476 | A1 | 4/2018 | Behnamrad et al. |

FOREIGN PATENT DOCUMENTS

| | | | | |
|---|---|---|---|---|
| CN | 203499776 | U | 3/2014 | |
| CN | 104214379 | A | 12/2014 | |
| CN | 104373178 | A | 2/2015 | |
| CN | 204961031 | * | 1/2016 | ............ B65D 25/02 |
| CN | 204961031 | U | 1/2016 | |
| DE | 20 2011 004 562 | U1 | 6/2011 | |
| DE | 10 2010 047 348 | A1 | 4/2012 | |
| DE | 10 2015 105 675 | B3 | 9/2016 | |
| GB | 613386 | A | 11/1948 | |
| JP | 2000320708 | A | 11/2000 | |
| RU | 2573436 | C2 | 1/2016 | |
| WO | WO 2014/121966 | A1 | 8/2014 | |

OTHER PUBLICATIONS

First Indian Office Action, Intellectual Property India Patent Application No. 202117017464, Jan. 28, 2022, 6 pages.
First Russian Office Action, Federal Service for Intellectual Property Patent Application No. 2021110860, Dec. 28, 2021, 10 pages.
European Patent Office, Extended European Search Report, EP Patent Application No. 18934577.0, Apr. 12, 2022, five pages.

* cited by examiner

UREA TANK FOR SCR AFTERTREATMENT SYSTEM, AND TANK COVER THEREOF

CROSS-REFERENCE TO RELATED APPLICATION

The present application is a 35 U.S.C. 371 Patent Application of PCT Application No. PCT/CN2018/108515, titled "UREA TANK FOR SCR AFTERTREATMENT SYSTEM, AND TANK COVER THEREOF", filed on Sep. 29, 2018.

FIELD

The present application relates to the technical field of diesel engines, and in particular to a urea tank for SCR aftertreatment system and a tank cover thereof.

BACKGROUND

Nowadays, the laws and regulations on automobile emissions are becoming stricter and stricter, which also puts forward higher requirements for automobile exhaust aftertreatment. SCR catalytic reduction technology is an important technical route to reduce NOx emissions from diesel engines and meet China National IV standard and the above emission regulations.

The SCR aftertreatment system includes a urea aqueous solution storage device called urea tank. The urea tank is mainly composed of a tank body, a tank cover and sensors. The urea tank needs to have ventilation function to ensure the balance of pressure inside and outside the tank body, which is generally realized by punching holes on the tank cover. In order to prevent dust from entering the urea tank through the ventilation hole and causing urea solution pollution, a water-impermeable and air-permeable membrane is covered on the ventilation hole.

However, the ventilation capacity of the water-impermeable and air-permeable membrane is limited, and the air pressure and air flow rate of the air-assisted urea pump are relatively large during the power-off backblowing, so the water-impermeable and air-permeable membrane is easy to be blown out, thus losing its dustproof function. In addition, when outside rain and water accidentally enter the tank cover, the water-impermeable and air-permeable membrane is easily submerged and blocked, which leads to the failure of the air-permeable function. Therefore, when the urea pump draws urea from the urea tank, the suction resistance of the urea pump increases, which makes it difficult to build pressure, and the urea tank is deflated or even cracked; and when the (air-assisted) urea pump is powered off for back blowing, the high-pressure air delivered to the urea tank cannot be discharged in time, causing the urea tank to swell and burst.

In summary, how to improve the reliability of the urea tank has become an urgent technical issue to be addressed by those skilled in the art.

SUMMARY

In view of this, a urea tank for SCR aftertreatment system and a tank cover thereof are provided according to the present application. The tank cover can make the urea tank safer and more reliable.

In order to achieve the above object, the present application provides the following solutions.

A tank cover of a urea tank for SCR aftertreatment system is provided. The tank cover is mounted at a liquid injection port of a urea tank body of the urea tank. A ventilation hole is provided at a part of the tank cover corresponding to the liquid injection port. The ventilation hole is covered by a water-impermeable and air-permeable membrane, and an air inlet hole and an air outlet hole are provided at the part of the tank cover corresponding to the liquid injection port. A first constant pressure check valve and a second constant pressure check valve are mounted on the tank cover. An inlet of the first constant pressure check valve is butted with the air outlet hole, and an outlet of the first constant pressure check valve is in communication with the outside of the tank body. An inlet of the second constant pressure check valve is butted with the air inlet hole, and an outlet of the second constant pressure check valve is in communication with the inside of the tank body.

Preferably, in the tank cover, a pressure threshold of the first constant pressure check valve and a pressure threshold of the second constant pressure check valve are adjustable.

Preferably, in the tank cover, the first constant pressure check valve includes a cylinder body and a baffle arranged in the cylinder body, the baffle is movably connected with the cylinder body, one end of the cylinder body is closed, a port at another end is the inlet of the first constant pressure check valve, and the outlet of the first constant pressure check valve is provided on a wall of the cylinder body; and the baffle is configured to cover the inlet of the first constant pressure check valve, and an elastic member configured to reset the baffle is arranged in the cylinder body.

Preferably, in the tank cover, the elastic member is a spring.

Preferably, in the tank cover, a valve rod movably connected with the cylinder body is arranged in the cylinder body, the baffle is fixedly connected with one end of the valve rod, and the elastic member is a compression spring sleeved on the valve rod.

Preferably, in the tank cover, the second constant pressure check valve has the same structure as the first constant pressure check valve.

Preferably, in the tank cover, the tank cover includes a barrel-shaped inner shell and a cap-shaped outer shell. The ventilation hole, the air inlet hole and the air outlet hole are all arranged at the barrel bottom of the inner shell. A barrel mouth of the inner shell is first folded outward, and then folded toward a barrel body of the inner shell to form a cylindrical connecting portion. The outer shell covers the connecting portion, a gap for ventilation is formed between an outer wall of the connecting portion and an inner wall of the outer shell, and an internal thread is provided at the inner wall of the connecting portion for connecting with the tank body.

Preferably, in the tank cover, the baffle and the valve rod are integrally formed.

Preferably, in the tank cover, the baffle is made of rubber.

A urea tank for an SCR aftertreatment system is provided, which includes a tank cover, where the tank cover is the tank cover disclosed in any one of the above aspects.

According to the above technical solution, in the tank cover of the urea tank for SCR aftertreatment system provided by the present application, the part of the tank cover corresponding to the liquid injection port of the tank body is not only provided with the ventilation hole, but also provided with the air inlet hole and the air outlet hole. The ventilation hole is covered by the water-impermeable and air-permeable membrane, the first constant pressure check valve is mounted at the air outlet hole, and the second constant pressure check valve is mounted at the air inlet hole. The inlet of the first constant pressure check valve is butted with the air outlet hole, and the outlet of the first constant pressure check valve is in communication with the outside of the tank body. The inlet of the second constant pressure check valve is butted with the air inlet hole, and the outlet of the second constant pressure check valve is in communication with the inside of the tank body.

The tank cover is mounted at the liquid injection port of the tank body. When the water-impermeable and air-permeable membrane works normally, the membrane can provide the required ventilation function for the tank body. At this time, both the first constant pressure check valve and the second constant pressure check valve are closed. When the air permeability of the water-impermeable and air-permeable membrane is insufficient, for example, when the water-impermeable and air-permeable membrane is submerged and blocked by outside rain, water, etc., the pressure difference between inside and outside the tank body will increase no matter whether the urea pump sucks liquid from the tank body or the urea pump is powered off for back blowing. Once the pressure difference between inside and outside rises to the pressure threshold of the constant pressure check valve, the first constant pressure check valve or the second constant pressure check valve will be opened. In a case that the urea pump is powered off for back blowing, the first constant pressure check valve is opened, and the air inside the tank body can be discharged out of the tank body through the air outlet hole, so as to avoid cracking caused by bulging deformation of the tank body. In a case that the urea pump draws liquid from the tank body, the second constant pressure check valve is opened, and the air outside the tank body can enter the tank body through the air inlet hole to avoid the tank body from being deflated. Therefore, with the tank cover provided by the present application, the internal pressure and the external pressure of the tank body will not be seriously unbalanced due to insufficient air permeability of the water-impermeable and air-permeable membrane, thus the occurrence of deflation deformation or bulging deformation can be effectively avoided, and the urea tank is safer and more reliable.

BRIEF DESCRIPTION OF THE DRAWINGS

For more clearly illustrating embodiments of the present application or technical solutions in the conventional technology, the drawings referred to for describing the embodiments or the conventional technology will be briefly described hereinafter. Apparently, the drawings in the following description are only some examples of the present application, and for those skilled in the art, other drawings may be obtained based on the provided drawings without any creative efforts.

Figure 1:
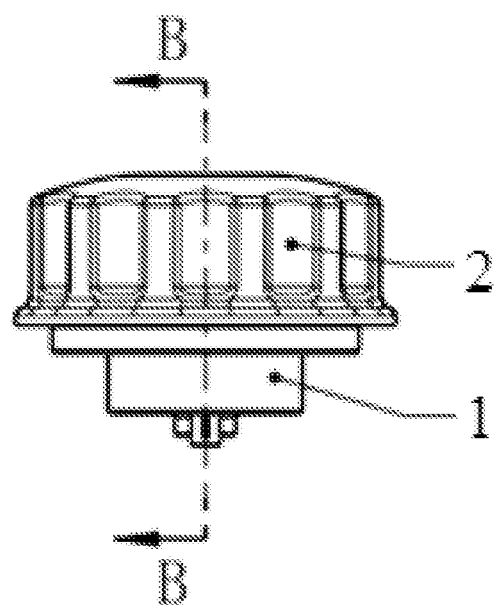
FIG. 1 is a schematic view of a tank cover of a urea tank for an SCR aftertreatment system provided by an embodiment of the present application.

Reference numerals in the drawings are as follows:

| | |
|---|---|
| 1 inner shell; | 11 air outlet hole; |
| 2 outer shell; | 3 first constant pressure check valve; |
| 31 baffle; | 32 compression spring; |
| 33 valve rod; | 4 second constant pressure check valve; |
| 5 water-impermeable and air-permeable membrane. | |

DETAILED DESCRIPTION OF THE EMBODIMENTS

To facilitate understanding, the present application will be further described below in conjunction with the drawings.

Figure 2:
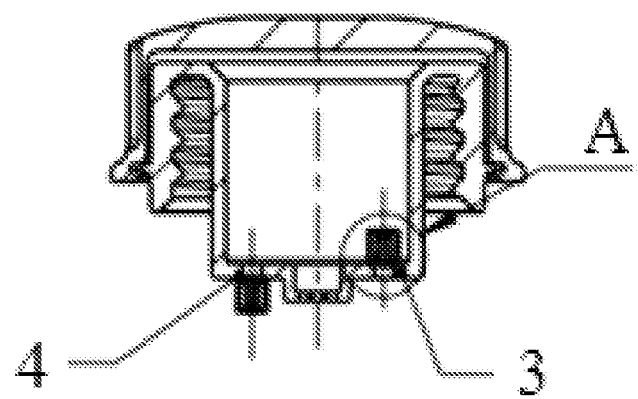
FIG. 2 is a sectional view taken along line B-B in FIG. 1.
Figure 3:
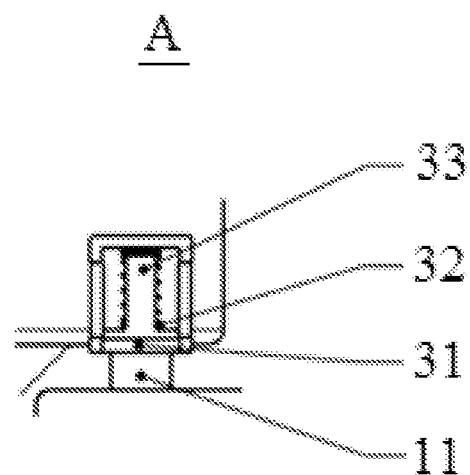
FIG. 3 is an enlarged view of portion A in FIG. 2.
Figure 4:
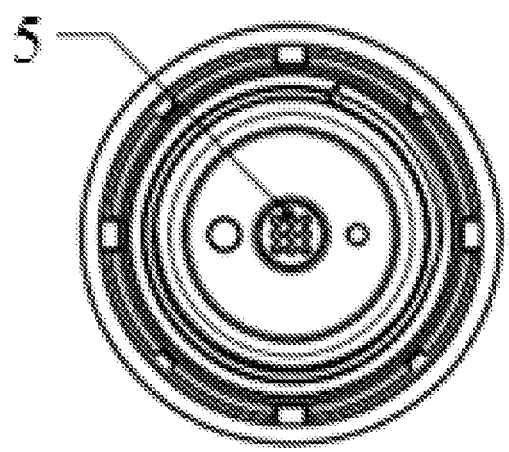
FIG. 4 is a bottom view of FIG. 1.

Referring to FIGS. 1 to 4, FIG. 1 is a schematic view of a tank cover of a urea tank for an SCR aftertreatment system provided by an embodiment of the present application, FIG. 2 is a sectional view taken along line B-B in FIG. 1, FIG. 3 is an enlarged view of portion A in FIG. 2, and FIG. 4 is a bottom view of FIG. 1.

The tank cover provided by the embodiment of the present application is mounted at an liquid injection port of the urea tank body, and a ventilation hole is provided at a part of the tank cover corresponding to the liquid injection port, and the ventilation hole is covered by a water-impermeable and air-permeable membrane 5, as shown in FIG. 4. Besides, the air inlet hole (not denoted in the drawings) and the air outlet hole 11 are provided at the part of the tank cover corresponding to the liquid injection port. As shown in FIG. 2 and FIG. 3, the first constant pressure check valve 3 and the second constant pressure check valve 4 are mounted on the tank cover, the inlet of the first constant pressure check valve 3 is butted with the air outlet hole 11, and the outlet of the first constant pressure check valve 3 is in communication with the outside of the tank body. The inlet of the second constant pressure check valve 4 is butted with the air inlet hole, and the outlet of the second constant pressure check valve 4 is in communication with the inside of the tank body.

The working principle of the tank cover provided by the embodiments of the present application is as follows.

When the water-impermeable and air-permeable membrane 5 works normally, it can provide the required ventilation function for the tank body. At this time, both the first constant pressure check valve 3 and the second constant pressure check valve 4 are closed. When the air permeability of the water-impermeable and air-permeable membrane 5 is insufficient, for example, when the water-impermeable and air-permeable membrane 5 is submerged and blocked by outside rain, water, etc., the first constant pressure check valve 3 and the second constant pressure check valve 4 work in the following two situations respectively:

a) in the case that the urea pump is powered off for back blowing, the air pressure in the tank body gradually increases at the beginning, and the pressure difference between inside and outside the tank body increases accordingly, and when the pressure difference between inside and outside rises to the pressure threshold of the first constant pressure check valve 3, the first constant pressure check valve 3 is opened under the pressure difference, so the air inside the tank body is discharged to the outside of the tank body through the air outlet hole 11 to avoid cracking caused by bulging deformation of the tank body; and b) in the case that the urea pump sucks liquid from the tank body, the air pressure in the tank body gradually decreases at the beginning, which leads to the increase of pressure difference between inside and outside the tank body, and when the pressure difference between inside and outside rises to the pressure threshold of the second constant pressure check valve 4, the second constant pressure check valve 4 is opened under the pressure difference, so the air outside the tank body enters the tank body through the air inlet hole to avoid the tank body from being deflated.

According to the above working principle, with the tank cover provided by the present application, the internal pressure and the external pressure of the tank body will not be seriously unbalanced due to insufficient air permeability of the water-impermeable and air-permeable membrane 5, thus the occurrence of deflation deformation or bulging deformation can be effectively avoided, and the urea tank is safer and more reliable.

In practical application, the pressure thresholds of the first constant pressure check valve 3 and the second constant pressure check valve 4 generally range from 3 kPa to 5 kPa. In order to set the pressure thresholds easily, both the first constant pressure check valve 3 and the second constant pressure check valve 4 can be designed with adjustable pressure thresholds.

Referring to FIG. 1 and FIG. 2, in this embodiment, the tank cover includes a barrel-shaped inner shell 1 and a cap-shaped outer shell 2. The ventilation hole, the air inlet hole and the air outlet hole 11 are all arranged at the barrel bottom of the inner shell 1. A barrel mouth of the inner shell 1 is first folded outward, and then folded toward a barrel body of the inner shell 1 to form a cylindrical connecting portion. The outer shell 2 covers the connecting portion of the inner shell 1, a gap for ventilation is formed between an outer wall of the connecting portion and an inner wall of the outer shell 2, and an internal thread is provided at the inner wall of the connecting portion for connecting with the tank body.

For the convenience of manufacturing, the first constant pressure check valve 3 and the second constant pressure check valve 4 are generally of the same type, that is, the first constant pressure check valve 3 and the second constant pressure check valve 4 have the same structure, and only need to be arranged in opposite directions during mounting. In this way, it can be ensured that the air has opposite circulation directions in the first constant pressure check valve 3 and the second constant pressure check valve 4, thus meeting the intake and exhaust requirements of the urea tank.

Figure 5:
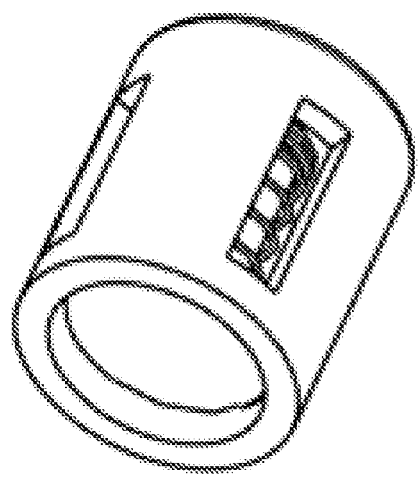
FIG. 5 is a schematic perspective view of a component 3 in FIG. 2.
Figure 6:
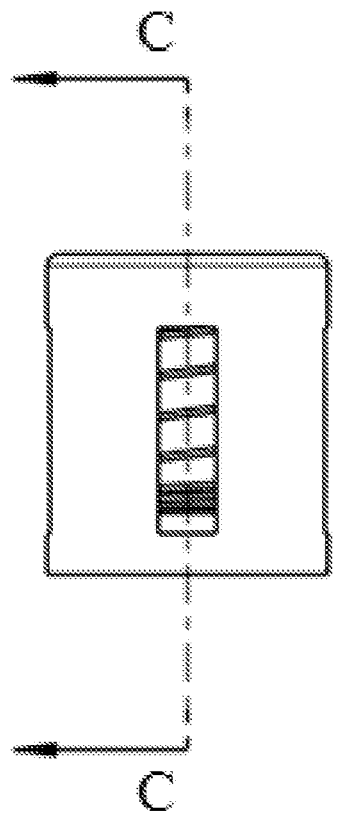
FIG. 6 is a front view of the component 3 in FIG. 2.
Figure 7:
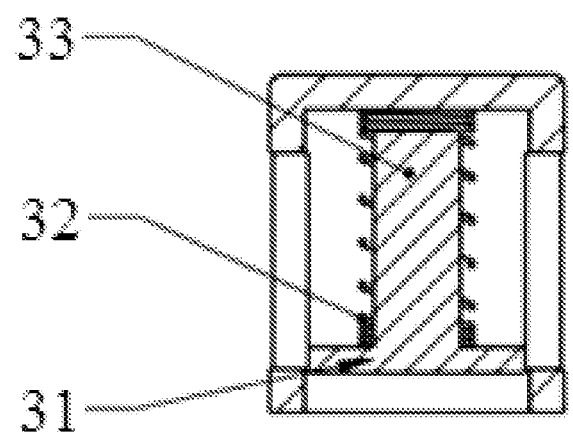
FIG. 7 is a sectional view taken along line C-C in FIG. 6.

In the following, the first constant pressure check valve 3 is taken as an example to introduce the specific structure of the constant pressure check valve designed in this embodiment. Referring to FIG. 5 to FIG. 7, the first constant pressure check valve 3 includes a cylinder body (not marked in the Figure) and a baffle 31 provided in the cylinder body, and the baffle 31 is movably connected with the cylinder body. One end of the cylinder body is closed, a port at another end is the inlet of the first constant pressure check valve 3, and the outlet of the first constant pressure check valve 3 is provided on a wall of the cylinder body. The baffle 31 is configured to cover the inlet of the first constant pressure check valve 3, and an elastic member configured to reset the baffle 31 is arranged in the cylinder body.

In practical application, the elastic member is a spring, as shown in FIG. 7. In this embodiment, the elastic member is a compression spring 32 sleeved on a valve rod 33. One end of the valve rod 33 is fixedly connected with the baffle 31, and the valve rod 33 is movably connected with the cylinder body. The baffle 31 is pressed against the port of the cylinder body (that is, the inlet of the first constant pressure check valve 3) under the action of the compression spring 32. As shown in FIG. 2 and FIG. 4, in the case that the urea pump is powered off for back blowing, if the air permeability of the water-impermeable and air-permeable membrane 5 is insufficient, the pressure in the tank body of the urea tank will gradually increase, and as the pressure difference between inside and outside rises to the pressure threshold of the first constant pressure check valve 3, the baffle 31 at the inlet of the first constant pressure check valve 3 will be pushed open. Therefore, the high-pressure air in the tank body is quickly exhausted from the air outlet hole 11, so as to avoid long-time excessive pressure in the tank body.

In practical application, the baffle 31 and the valve rod 33 may be integrally formed. In order to from close contact with the inlet of the first constant pressure check valve 3, the baffle 31 is generally made of rubber.

A urea tank for an SCR aftertreatment system is further provided according to the present application, which includes the tank cover disclosed in the above embodiments. Since the tank cover disclosed in the above embodiments has the above technical effects, the urea tank with the tank cover also has the above technical effects, which will not be repeated here.

According to the above description of the disclosed embodiments, those skilled in the art can implement or practice the present application. Various modifications to these embodiments will be apparent to those skilled in the art, and the general principles defined herein may be implemented in other embodiments without departing from the spirit or scope of the present application. Therefore, the present application shall not be limited to the embodiments illustrated herein, but shall conform to the widest scope consistent with the principles and novel features disclosed herein.

The invention claimed is:

1. A tank cover of a urea tank for SCR aftertreatment system, wherein the tank cover is mounted at a liquid injection port of a urea tank body of the urea tank, a ventilation hole is provided at a part of the tank cover corresponding to the liquid injection port, the ventilation hole is covered by a water-impermeable and air-permeable membrane,
    an air inlet hole and an air outlet hole are provided at the part of the tank cover corresponding to the liquid injection port, a first constant pressure check valve and a second constant pressure check valve are mounted on the tank cover,
    an inlet of the first constant pressure check valve is butted with the air outlet hole, and an outlet of the first constant pressure check valve is in communication with outside of the tank body,
    an inlet of the second constant pressure check valve is butted with the air inlet hole, and an outlet of the second constant pressure check valve is in communication with inside of the tank body.

2. The tank cover according to claim 1, wherein a pressure threshold of the first constant pressure check valve and a pressure threshold of the second constant pressure check valve are adjustable.

3. The tank cover according to claim 1, wherein the first constant pressure check valve comprises a cylinder body and a baffle arranged in the cylinder body, the baffle is movably connected with the cylinder body, one end of the cylinder body is closed, a port at another end is the inlet of the first constant pressure check valve, and the outlet of the first constant pressure check valve is provided on a wall of the cylinder body; and the baffle is configured to cover the inlet of the first constant pressure check valve, and an elastic member configured to reset the baffle is arranged in the cylinder body.

4. The tank cover according to claim 3, wherein the elastic member is a spring.

5. The tank cover according to claim 4, wherein a valve rod movably connected with the cylinder body is arranged in the cylinder body, the baffle is fixedly connected with one end of the valve rod, and the elastic member is a compression spring sleeved on the valve rod.

6. The tank cover according to claim 5, wherein the second constant pressure check valve has a same structure as the first constant pressure check valve.

7. The tank cover according to claim 6, wherein the tank cover comprises a barrel-shaped inner shell and a cap-shaped outer shell, the ventilation hole, the air inlet hole and the air outlet hole are all arranged at a barrel bottom of the inner shell, a barrel mouth of the inner shell is first folded outward, and then folded toward a barrel body of the inner shell to form a cylindrical connecting portion, and the outer shell covers the connecting portion, a gap for ventilation is formed between an outer wall of the connecting portion and an inner wall of the outer shell, and an internal thread is provided at the inner wall of the connecting portion for connecting with the tank body.

8. The tank cover according to claim 7, wherein the baffle and the valve rod are integrally formed.

9. The tank cover according to claim 7, wherein the baffle is made of rubber.

10. A urea tank for an SCR aftertreatment system comprising the tank cover according to claim 1.

* * * * *